PLUNGER OPERATED PHOTOELECTRIC SWITCH CONVERTIBLE FROM NORMALLY ON TO NORMALLY OFF

Filed June 19, 1964

INVENTORS
ROBERT C. MIERENDORF
ERIK J. NIELSEN
ROBERT D. BOLEY
BY Harold J. Rathbun
Atty.

United States Patent Office 3,336,482

Patented Aug. 15, 1967

3,336,482

PLUNGER OPERATED PHOTOELECTRIC SWITCH CONVERTIBLE FROM NORMALLY ON TO NORMALLY OFF

Robert C. Mierendorf, Wauwatosa, Erik J. Nielsen, Mequon, and Robert D. Boley, Milwaukee, Wis., assignors to Square D Company, Park Ridge, Ill., a corporation of Illinois Filed June 19, 1964, Ser. No. 376,523
5 Claims. (Cl. 250—229)

ABSTRACT OF THE DISCLOSURE

A plunger operated photoelectric switch having an electric lamp positioned within a cylindrical portion of an operating plunger and a photocell positioned externally of the plunger. The plunger acts as a shutter between the lamp and photocell and has a pair of axially staggered slots in opposite sides of the cylindrical portion so the plunger may be indexed in either of two positions to provide the switch with a normally ON or a normally OFF type of operation.

This invention relates in general to contactless switches and more particularly to a contactless switch including a light source and a photosensitive device and useful for selectively switching transistorized logic elements in static control systems and the like.

As pointed out in a copending application filed Apr. 16, 1964, as Ser. No. 360,346 and assigned to the assignee of the present invention, transistorized logic elements are being used in electrical control systems to an increasing degree because of their inherent reliability, absence of moving parts, fast switching time, small size, and other advantages. The transistorized logic circuitry of such systems is conventionally controlled by the application of voltage pulses of predetermined magnitude and polarity to the inputs of the various logic elements to selectively control the functions thereof either singularly or in various combinations.

Previously such voltage pulses have been supplied by completing a circuit from a source of voltage to the input of a logic element through a conventional contact-making device such as a push-button switch or limit switch. Such contact-making devices inherently prevent a so-called static control system from being, in fact, truly static. A contactless switch device is therefore desirable to overcome this disadvantage. One such device, an impulse voltage generator, is disclosed in the aforementioned copending application. Although this impulse voltage generator is suitable for a large number of applications, there is a need for a smaller, more sensitive, and less expensive contactless switch device for logic elements in certain other applications. More particularly, there are static control systems which require a contactless switch of extremely small size which operates after a relatively short travel of its associated actuator. In addition, the operating force available to actuate the device may be smaller than that required by the impulse voltage generator. Further, some applications require either a maintained presentation to the logic device of either a normally present or normally absent signal to effectively simulate the action of a conventional contact-making device.

Accordingly, it is an object of the present invention to provide an improved contactless switch of relatively simple construction and small size which is capable of providing a voltage signal of the uniformity and duration required for reliably controlling transistorized logic circuitry in static control systems.

Another object is to provide a contactless switch having an actuator which is movable with little force and which needs to move for only a relatively short distance to effect operation.

Another object is to provide a contactless switch wherein light from a self-contained lamp impinging on a light sensitive element is controlled by a reciprocative shutter mechanism thereby to effect variations in the electrical resistance of the light sensitive element.

Another object is to provide a contactless switch wherein a reciprocative shutter mechanism controls the light of a lamp falling on a light sensitive element by presentation or non-presentation of an aperture in the light path.

Another object is to provide a contactless switch in accordance with the preceding object in which the shutter mechanism has circumferentially spaced apertures so that in one of its two turned positions the light falls on the light sensitive element only when the shutter mechanism is in its normal unactuated position, analogous to a normally closed contact, and in the other of its turned positions, the light falls on the light sensitive element only when the shutter mechanism is in its actuated position, analogous to a normally open contact.

Another object is to provide a contactless switch in accordance with the preceding object in which the apertures are diametrically and axially spaced so that the two turned positions are 180 degrees apart.

In practicing the invention, a housing assembly is provided for a photoelectric cell, an incandescent lamp, and a reciprocative shutter mechanism. The lamp and cell are positioned within the housing so that the light from the lamp falling on the photoelectric cell is selectively controlled by axial movement of the shutter mechanism. The photoelectric cell is preferably of the photoconductive type and exhibits a relatively large variation in its resistance between conditions of exposure and non-exposure to incident light. It is therefore seen that the photoelectric cell, when electrically connected between a signal source and a device to be controlled, such as a NOR logic element, produces conditions analogous to the presence or absence of a control signal, depending upon its resistance.

A portion of the shutter mechanism is interposed between the photoelectric cell and the lamp so as to control the amount of light impinging on the cell. The shutter mechanism has a pair of circumferentially spaced but axially unaligned apertures in the form of slots so that, in one of its two turned positions, one of the apertures is positioned to permit the light to fall on the cell only in the actuated position of the shutter mechanism while, in the other of its two turned positions, the other one of the shutter apertures is positioned to permit the light to fall on the cell only in the normal or unactuated position of the shutter mechanism. The axial position of the shutter mechanism in either of its turned positions is determined by the operation of a spring-biased push button actuator forming an integral part of the shutter mechanism and operatively accessible from the bottom of the housing.

Other objects and advantages of the invention will become apparent from the following specifications wherein reference is made to the drawings, in which.

Figures 1, 2, 3, 4, 5, 6:
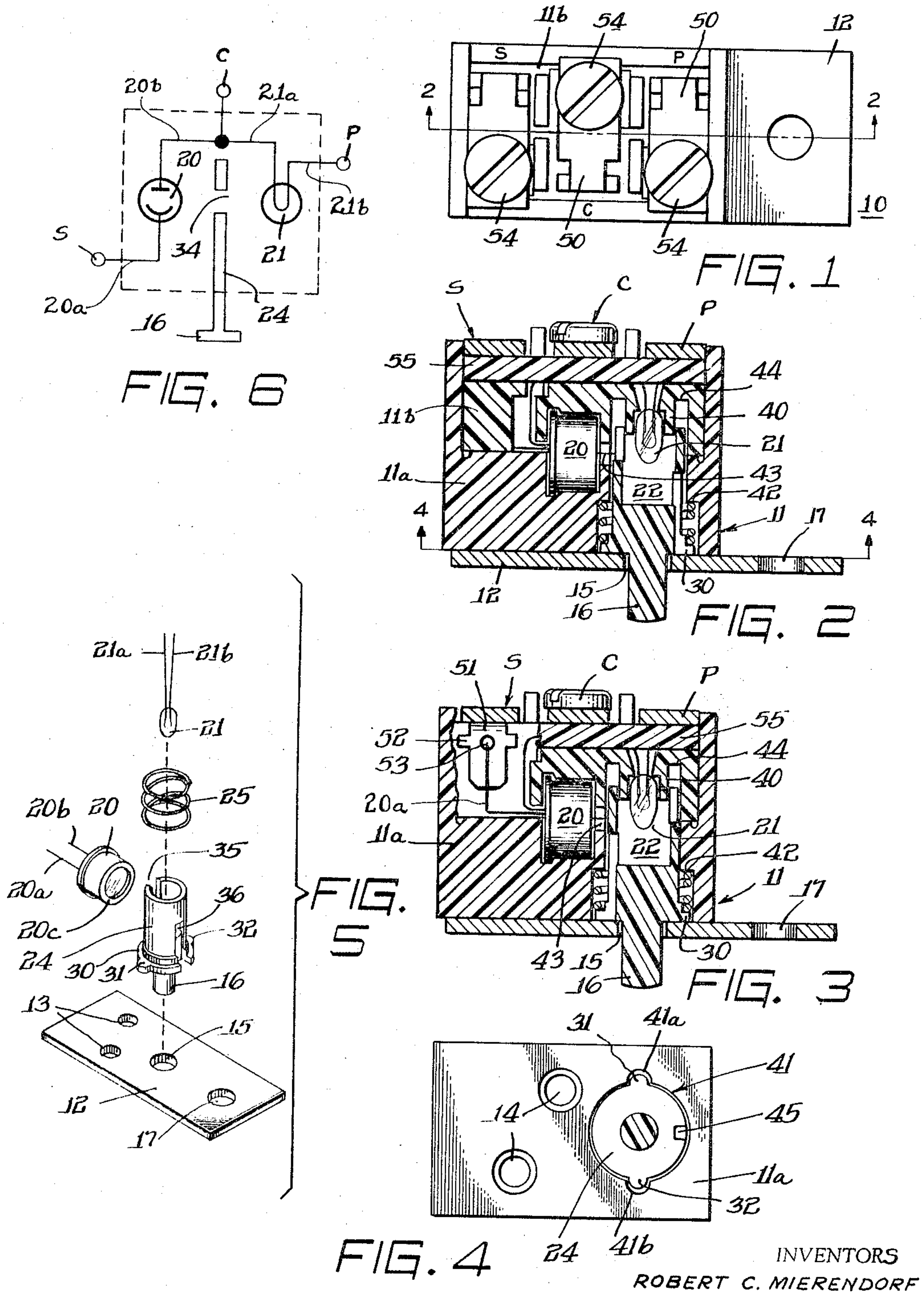
FIG. 1 is a top plan view of a contactless switch in accordance with the invention.
FIG. 2 is a sectional view taken generally along the line 2—2 of FIG. 1 and with the shutter mechanism rotatably positioned to permit light to fall on the light sensitive element in the unactuated axial position of the shutter mechanism.
FIG. 3 is a sectional view similar to FIG. 2 but with the shutter mechanism rotatably positioned to permit light to fall on the light sensitive element only in the actuated axial position of the shutter mechanism and with one of the terminals shown in detail.
FIG. 4 is a sectional view taken generally along line 4—4 of FIG. 2.
FIG. 5 is an exploded view of the shutter, actuating spring, photoelectric cell, lamp, and base plate of the switch of FIG. 1.
FIG. 6 is a partial diagrammatic and schematic representation of the switch of FIG. 1.

Referring to the drawings, a contactless switching device 10 in accordance with the present invention comprises a housing assembly 11 and a mounting plate 12 which may be of metal. The housing assembly 11 is preferably formed of phenolic material and includes a base portion 11*a* having a formed cavity in which a cap portion 11*b* is slidably received. In the embodiment shown, the total volume of the switching device 10 is less than a cubic inch. The base plate 12 is preferably affixed to the housing base 11*a* by machine screws (not shown) inserted through holes 13 in the plate 12 and threadably received in complementary mating receptacles 14 (FIG. 4) in the housing base 11*a*. The base plate 12 also has an opening 15 through which a push-button actuator 16 extends and an opening 17 for mounting the switching device 10 as a composite assembly.

Internally of the housing 11, the switching device 10 contains a photosensitive device such as a photoconductive cell 20, a light source such as an incandescent lamp 21, and a reciprocative shutter mechanism indicated generally at 22 of which the pushbutton actuator 16 is an integral part.

As best seen in FIG. 5, the lamp 21 has supply leads 21*a* and 21*b* while the photoconductive cell (hereinafter referred to as photocell) 20 includes leads 20*a* and 20*b* and a translucent window or aperture 20*c* through which light may impinge on a light sensitive element (not shown).

The shutter mechanism 22 consists of a substantially hollow cylindrical plunger 24 and a helical bias spring 25. The plunger 24 includes a formed stop ring or flange portion 30 having a pair of diametrically opposed complementary guide tabs of fingers 31 and 32 extending laterally therefrom. The plunger 24 further includes a pair of apertures or slots 35 and 36. The slots 35 and 36 are circumferentially spaced around the periphery of the plunger 24 in a manner substantially 180 degrees apart but are axially unaligned along the axis of the plunger 24. The slot 35 is positioned so that light from the lamp 21 passes therethrough when the shutter mechanism 22 is in the unactuated position shown while the slot 36 is positioned so that light from the lamp 21 passes therethrough only when the shutter mechanism is in its actuated position as will be hereinafter described. The plunger 24 terminates in the push-button actuator 16, forming an integral part thereof.

In assembly, the photocell 20 is retained within a formed cavity defined by recesses in the abutting faces of the base portion 11*a* and the cap portion 11*b* in the manner shown. The lamp 21 is retained within a ring 40 formed in the cap portion 11*b* and the reciprocative plunger 24 is slidably contained within a cylindrical cavity 41 formed in the base portion 11*a* and extending partially upward within the cap portion 11*b* around the annular ring 40. As shown in FIG. 4, the cavity 41 further includes a pair of semi-cylindrical, diametrically-spaced recesses 41*a* and 41*b* which slidably receive the guide fingers 31 and 32 of the plunger 24. Preferably, the recesses 41*a* and 41*b* have an axial length just sufficient to permit full reciprocation of the plunger 24. The recesses 41*a* and 41*b* in cooperation with the guide fingers 31 and 32 maintain the plunger 24 selectively in either of two rotated positions while facilitating axial reciprocative movement thereof. The plunger 24 can be rotated from one position to the other only by removing the base plate 12 and partially withdrawing the plunger 24 from the cavity 41 to a distance where the guide fingers 31 and 32 clear the recesses 41*a* and 41*b*.

The cavity 41 is suitably enlarged in the area adjacent the base plate 12 so as to provide space to contain the helical spring 25, which spring is held captive between an annular shoulder 42 formed in the cavity 41 and the flange 30 on the plunger 24. The plunger 24 is movable axially within the cavity 41 between the limits defined by the flange 30 abutting the mounting plate 12 and a position where the forward end of the plunger 24 abuts the barrier 44.

The photocell 20 and the lamp 21 are positioned within the housing 11 in a manner whereby the light from the lamp 21 impinges directly on the light sensitive element of the photocell 20 through an aperture 43 defined by formed recesses in the abutting faces of the base portion 11*a* and the cap portion 11*b* when there is no physical obstruction interposed in the light path by the plunger 24. When the plunger 24 is inserted within the cavity 41 in one of its two turned positions, the aperture 35 is aligned with the aperture 43 when the plunger 24 is in the unactuated position, as shown in FIG. 2. Rotating the plunger 24 approximately 180 degrees to the other of its two positions and then inserting it within the cavity 41 results in a wall portion of the plunger 24 being interposed between the photocell 20 and the lamp 21 when the plunger 24 is in the unactuated position as shown in FIG. 3. In the latter position, the aperture 36 is aligned with aperture 43 to permit light from lamp 21 to impinge on the photocell 20 only when the push-button actuator 16 is depressed to move the plunger 24 upwardly to a position where the forward end thereof abuts against the barrier 44.

Screw terminals S, C, and P are provided to terminate the photocell leads 20*a* and 20*b* and the lamp supply leads 21*a* and 21*b*. Each of the screw terminals S, C, and P consists of an L-shaped member 50 having a depending portion 51 (shown in FIG. 3) which is frictionally received within a complementary slot (not shown) provided in the cap portion 11*b*. The portion 51 includes a pair of laterally extending tabs 52 and an opening 53 therebetween. The lead 20*a* of the photocell 20 is suitably connected to terminal S by insertion in the opening 53 and soldering. In like manner, the lead 21*b* of the lamp 21 is connected to terminal P while the leads 20*b* and 21*a* of photocell 20 and lamp 21 are both connected to the common terminal C. As best seen in FIG. 1, the terminals S, C, and P further include machine screws 54 for accommodating the associated external conductors (not shown).

The assembly of the switching device 10 is completed by the introduction of suitable encapsulating material 55 in the space above the cap portion 11*b* which serves to firmly anchor the screw terminals S, C, and P and to seal the housing 11 to form a light-tight enclosure and prevent ambient light from interfering with proper operation.

In operation, a source of voltage is applied between the terminals C and P, thereby energizing the lamp 21. In the diagrammatic representation shown in FIG. 6, which corresponds generally to the physical structure shown in FIG. 2, the light from the lamp 21 normally impinges on the photocell 20 with the shutter mechanism 22 in the unactuated position. Exposure of photocell 20 to light results in a substantial reduction in its internal resistance, to the order of 3000 ohms, as compared to a value of the order of 3 megohms in the unexposed condition. The low resistance state of the photocell 20 therefore result in a higher potential being present at terminal S than would be present in the higher resistance state. The higher potential at the terminal S when the photocell 20 is in a low resistance state may be considered as the presence of a control signal, analogous to a closed contact condition in a conventional contact-making device, whereas the lower potential at the terminal S when the photocell 20 is in a high resistance state may be considered as the absence of a control signal, analogous to an open contact condition. It is therefore seen that when the reciprocative plunger 24 of the shutter mechanism 22 is in the position as shown in FIG. 2, the switching device 10 functions as a normally closed contact device whereas, when the plunger 24 has been rotated to the position shown in FIG. 3, the switching device 10 functions as a normally open contact device.

We claim:

1. A contactless switching device comprising a substantially light-tight enclosure, a photoelectric cell, an electrical lamp, means positioning said photoelectric cell and said lamp with respect to each other within said enclosure so that light from said lamp impinges on said photoelectric cell through a path, said photoelectric cell exhibiting a substantial change in its electrical characteristics upon a substantial change in the amount of light impinging thereon, a first terminal means for applying a source of potential for energizing said lamp, a second terminal means connected to said photoelectric cell so as to be responsive to said change in said electrical characteristics of said photoelectric cell, operator means for controlling the amount of light from said lamp impinging on said photoelectric cell, said operator means including a cylindrical member interposed in said path, reciprocative axially between an actuated and an unactuated position, and having a pair of circumferentially spaced and axially unaligned apertures therein, and indexing means operative to retain said member selectively in a first turned position in which light from said lamp impinges on said photoelectric cell through one of said apertures only when said member is in said unactuated position and in a second turned position in which light from said lamp impinges on said photoelectric cell through the other of said apertures only when said member is in said actuated position.

2. A contactless switching device comprising a substantially light-tight enclosure, a photoelectric cell, an electrical lamp, means positioning said photoelectric cell and said lamp with respect to each other within said enclosure so that light from said lamp can impinge on said photoelectric cell through a path, said photoelectric cell exhibiting a change in its electrical characteristics upon a change in the amount of light impinging thereon, a first terminal means for applying a source of potential for energizing said lamp, a second terminal means connected to said photoelectric cell so as to be responsive to said change in said electrical characteristics of said photoelectric cell, operator means for controlling the amount of light from said lamp impinging on said photoelectric cell, said operator means including a cylindrical member interposed in said path, reciprocative linearly between an actuated and an unactuated position, and having a pair of circumferentially spaced and axially unaligned apertures therein, and indexing means operative to retain said member in a first and a second turned position selectively, the axial position and size of one of said apertures being such that, when said member is in said first turned position, light from said lamp impinges on said photoelectric cell when said member is in said unactuated position and said member prevents light from said lamp impinging on said photoelectric cell when said member is in said actuated position, and the axial position and size of the other of said apertures being such that, when said member is in said second turned position, light from said lamp impinges on said photoelectric cell when said member is in said actuated position and said member prevents light from impinging on said photoelectric cell when said member is in said unactuated position.

3. The structure as recited in claim 1 including an axially extending bore in the enclosure providing a guide for the member during movement of the member between the actuated and unactuated positions, and wherein the indexing means includes a pair of axially extending recesses in the bore and a pair of ears oppositely extending from the member into the recesses.

4. The structure as recited in claim 3 wherein the lamp is positioned in the bore and the member surrounds at least a portion of the lamp when the member is in an actuated position.

5. The structure as recited in claim 3 wherein the enclosure includes a detachable plate having an opening aligned with the bore and the cylindrical member includes an integral portion extending through the opening in the plate, said plate when detached exposing said bore and the cylindrical member for indexing the member in either of said first and second positions.

References Cited

UNITED STATES PATENTS

| | | | |
|---|---|---|---|
| 3,145,304 | 8/1964 | Boston et al. | 250—239 |
| 3,159,750 | 12/1964 | Kazan | 250—231 |
| 3,194,967 | 7/1965 | Mash | 250—211 |
| 3,205,366 | 9/1965 | Akin | 250—229 |
| 3,235,741 | 2/1966 | Plaisance | 250—229 |
| 3,258,601 | 6/1966 | Suleski | 250—211 |

RALPH G. NILSON, *Primary Examiner.*

M. A. LEAVITT, *Assistant Examiner.*